(12) United States Patent
Blase (10) Patent No.: US 12,490,759 B2
(45) Date of Patent: Dec. 9, 2025

(54) REDUCED-SUGAR FRUIT JUICE AND FRUIT MUST

(71) Applicant: Innovative Strategic Design, LLC, Cincinnati, OH (US)

(72) Inventor: Daniel J. Blase, St. Louis, MO (US)

(73) Assignee: Innovative Strategic Design, LLC, Cincinnati, OH (US)

( * ) Notice: Subject to any disclaimer, the term of this patent is extended or adjusted under 35 U.S.C. 154(b) by 265 days.

(21) Appl. No.: 16/988,100

(22) Filed: Aug. 7, 2020

(65) Prior Publication Data

US 2022/0039430 A1    Feb. 10, 2022

(51) Int. Cl.
    *A23L 2/08*      (2006.01)
    *A23L 2/06*      (2006.01)
    *A23L 33/00*    (2016.01)

(52) U.S. Cl.
    CPC ............... *A23L 2/085* (2013.01); *A23L 2/06* (2013.01); *A23L 33/30* (2016.08)

(58) Field of Classification Search
None
See application file for complete search history.

(56) References Cited

U.S. PATENT DOCUMENTS

| | | | |
|---|---|---|---|
| 3,767,526 A | 10/1973 | Suzuki et al. | |
| 4,676,988 A | 6/1987 | Efstathiou et al. | |
| 5,254,174 A | 10/1993 | Hansen et al. | |
| 5,382,294 A | 1/1995 | Rimedio et al. | |
| 5,403,604 A | 4/1995 | Black, Jr. et al. | |
| 6,299,694 B1 * | 10/2001 | Ma | C13B 20/144 127/46.2 |
| 7,074,448 B2 | 7/2006 | Lineback et al. | |
| 7,108,887 B2 | 9/2006 | Chu et al. | |
| 8,440,248 B2 | 5/2013 | Cetrulo et al. | |
| 2008/0081096 A1 | 4/2008 | Subramaniam et al. | |
| 2011/0165310 A1 * | 7/2011 | Blase | A23L 33/20 426/599 |
| 2016/0213048 A1 * | 7/2016 | Blase | A23L 2/02 |

FOREIGN PATENT DOCUMENTS

| | | |
|---|---|---|
| EP | 0629707 A2 | 12/1994 |
| GB | 841620 A | 7/1960 |
| GB | 1027583 A | 4/1966 |
| GB | 1073284 A | 6/1967 |
| JP | S61254166 A | 11/1986 |
| JP | H10271980 A | 10/1998 |

OTHER PUBLICATIONS

Lenntech: https://www.lenntech.com/services/mwco.htm, printed Sep. 8, 2022. (Year: 2022).*

(Continued)

*Primary Examiner* — Patricia A George
(74) *Attorney, Agent, or Firm* — HARNESS, DICKEY & PIERCE, P.L.C.

(57) ABSTRACT

A method of producing reduced-sugar fruit juice (with or without pulp) and reduced-sugar fruit must. The reduced-sugar fruit juice has similar nutrition, but with less sugar and calories than 100% fruit juice. Reduced-sugar grape must has similar nutrition and flavor profile, but with less sugars and calories than 100% grape must.

22 Claims, 2 Drawing Sheets

(56) References Cited

OTHER PUBLICATIONS

Jones: 14 Healthy Foods That are High in Potassium; published online at least by Apr. 1, 2019 at: https://web.archive.org/web/20190401092304/https://www.healthline.com/nutrition/high-potassium-foods (Year: 219).*

Enoksen: 3 Drinks That Have way More Sugar Than you Think; published online at least by Apr. 18, 2019 at: https://westdavisdental.com/blog/2747-2/ (Year: 2019).*

Kappos: Top 10" tips for improving patent prosecution; published Jun. 28, 2010. (Year: 2010).*

Mills: EP 0485030 B1 Published on Sep. 20, 1995. (Year: 1995).*

Kambouris: WO 2013/096996 A1 Published on Jul. 4, 2013. (Year: 213).*

Dow: Chromatographic separation of fructose and glucose with Dowex™ Monosphere™ resins; Form No. 177-01566-0209, 2010. (Year: 2010).*

See SDWF: Ultrafiltration, Nanofiltration and Reverse Osmosis; printed May 11, 2023 from web page indicated that this is a document of Jan. 23, 2017, at: https://www.safewater.org/fact-sheets-/2017/1/23/ultrafiltrationnanoandro#:~:text=An%20ultrafiltration%20filter%20has%20a,and%20may%20remove%20some%20virus (Year: 2017).*

GM: González-Montemayor: Honey and Syrups: Healthy and Natural Sweeteners with Functional Properties; Natural Beverages, 2019. (Year: 2019).*

USDA: Orange juice, raw (Includes foods for USDA's Food Distribution Program); published online at least by Apr. 7, 2019 at: https://web.archive.org/web/20190407203759/https://fdc.nal.usda.gov/fdc-app.html#/food-details/169098/nutrients (Year: 2019).*

Eat this much: Organic Pure Concord Grape Juice; Organic Pure Concord Grape Juice Nutrition Facts—Eat This Much; printed Dec. 10, 2024. (Year: 2024).* grapes.org: Brix of grapes; published online at least by Dec. 11, 2019 at https://web.archive.org/web/20191211052647/https://grapes.extension.org/brix/ (Year: 2019).*

Sinclair, Walton B., "The Grapefruit: Its Composition, Physiology and Products", Jun. 1972, University of California, pp. 74-79.

* cited by examiner

REDUCED-SUGAR FRUIT JUICE AND FRUIT MUST

BACKGROUND

Field

The present disclosure relates to a method of producing a reduced-sugar fruit juice and reduced-sugar fruit must. They have similar native concentrations of the non-sugar components and reduced-sugar solids as compared with 100% fruit juice or fruit must.

Description of the Related Art

Fruit juice is regulated by the US Food and Drug Administration (FDA). Fruit juice needs to meet a minimum degree Brix to be labeled as 100% juice. The standard of identity for single strength grape juice is 16.0° Brix. The standard identity for single strength orange juice is 11.8° Brix. A "juice beverage" is defined as a beverage containing less than 100% juice but more than 1% juice.

If the juice is adulterated or "if its nutrient profile was diminished to a level below the normal nutrient range for the juice," then that juice shall not be included in the total percentage juice declaration" (21 CFR §§ 101.30 & 102.33).

The consumption of orange, grape, and other fruit juices has steadily decreased over the past few years, partially due to its high-calorie content. As a result, the beverage industry has developed several technologies to produce reduced-sugar fruit juice beverages to meet the customer's demand. Each technology uses unique processes that have inherent advantages and disadvantages. The primary technology used to produce a reduced-sugar fruit juice is the dilution of fruit juice with water. The primary technology used to produce a reduced-sugar fruit must, for the production of wine and wine containing beverages, is to harvest the fruit before they are mature.

SUMMARY

Grape juice is an excellent source of vitamins, minerals, and other beneficial compounds, including but not limited to those identified according to the Recommended Daily Allowance (RDA). However, an 8-ounce (240 ml) glass of grape juice contains 35 grams of sugar, which equate to about 140 calories. The standard of identity for grape juice is based on the soluble solids or Brix (including fructose, glucose, and other soluble solids) of the juice. The standard of identity of grape juice is 16.0° Brix. Grape juice is composed of water, sugars (fructose. glucose, and trace amounts of sucrose), pigments (e.g., anthocyanins, etc.), polyphenols, acids (e.g., citric, malic, etc.), flavors, vitamins (e.g., ascorbic acid, vitamin E, etc.), minerals (e.g., potassium, magnesium, etc.), flavonoids (e.g., syringetin, laricitrin, etc.), antioxidants, fiber, pectin, free amino acids, lipids, enzymes, and other beneficial compounds.

Grape juice is produced by squeezing the liquid content from fresh grapes. The resulting juice (grape must) is passed through multiple screens, sieves, filters, or other processes to remove the grape skins, seeds, and small grape pieces. However, it is possible to remove the large and small particles using a single filtration system or centrifuge process.

The composition of the non-sugar solids in grape, apple, pear, and other "clear" fruit juices are unique to the individual juice producer and their proprietary manufacturing processes. Since they are standardized based on Brix and not the non-sugar solids, juice samples from different fruit varieties, location, time of year, maturity, and manufacturer (domestic and international) can have a significantly different non-sugar solids chemical composition. They also can have a different flavor profile, nutritional composition, average particle size, particle size distribution, and/or particle percent (wt./wt.) of the non-sugar solids. The technical and operational processing conditions are held as trade secrets by the juice manufacturer. The equipment used to produce clear fruit juice includes but it is not limited to passing the juice through a filter with organic filtering aid (e.g., rice hulls, paper fiber, organic materials, etc.), screens, plate and plate filters, or other filtration processes. Due to the crude and varied processing conditions as relates to the non-sugar solids, it is necessary to develop an innovative closed-loop process with well-defined parameters to control the fractionation, partial removal of the native sugars, and recombine of select fractions to produce reduced-sugar fruit juice and reduced-sugar fruit must (with or without fruit skins).

Concord and white grape juice (100%) has a 16.0° Brix, 140 calories, 35 grams of sugars, and contains a significant amount of beneficial compounds per 8 ounces serving.

Below are the ingredient statement and nutritional information for 100% Grape Juice.
 Ingredients: Grape juice from concentrate (filtered water, grape juice concentrate), grape juice, ascorbic acid, (vitamin C), and citric acid (for tartness)
 Nutrition Facts—Service Size 8 oz (240 ml). 100% Juice. Calories 140, Fat 0 g, Cholesterol 0 g, Sodium 0 mg, Total Carbohydrates 37 g 13%, Total Sugars 35 g, Protein <1 g. Amount per Serving % Daily Value—Calcium 2%, Potassium 140 mg 2%, Vitamin C 90 mg 100%. Not a significant source of Dietary Fiber, Vitamin A, or Iron.

Reduced-sugar grape juice, produced by diluting grape juice with water, is the primary process used to address the high caloric content of 100% grape juice. Additional ingredients, including but not limited to acids, color, flavor, natural or artificial sweetener, etc. may be added to the beverage. Reduced-sugar grape juice beverages typically contain about 28% grape juice; as a result, it also only contains only about 28% (wt./wt.) of the native vitamins, minerals, and other beneficial compounds of 100% grape juice. Some grape juice beverages only contain about 5% juice.

Below are the ingredient statement and nutritional information for a reduced-sugar concord or white grape juice beverage.
 Ingredients: Filtered water, grape juice, malic acid (for tartness), sodium citrate, fruit juice, and vegetable juice concentrates (for color), ascorbic acid (vitamin C), natural flavor, sucralose, and acesulfame potassium
 Nutrition Facts—Service Size 8 oz (240 ml) 28% Juice Calories 45, Fat 0 g, Cholesterol 0 g, Sodium 80 mg. Amount per serving % Daily Value—Total Carbohydrates 12 g 4%, Total Sugars 10 g, Protein 0 g, Vitamin C 100%

Grapes are also used to produce wine and wine beverages (e.g., wine coolers). Mature grapes are harvested, destemmed, and crushed. The resulting product is referred to as "grape must". Grape must has about a 20°-30° Brix. Red wines are produced by fermenting the grape must containing grape juice, skins, fruit pieces, and seeds. Grape must used to produce blush wines contain a portion of the grape skins, fruit pieces, and seeds. White wines are produced by fermenting grape must without skins, fruit pieces, and seeds.

A 5-ounce (150 ml) glass of wine, with about 11% alcohol, contains about 123 calories. A glass of wine has a calorie range of about 109 to 130, depending on the alcohol content. Most of the calories in wine come from the alcohol since alcohol has seven calories per gram, while carbohydrates (sugars) have four calories per gram.

The consumption of wine is plateauing since consumers are migrating to alcoholic beverages with reduced sugars, including hard fruit seltzer. However, there is also a growing market for low-sugar (reduced-calorie) wines with a full, mature, complex, and sophisticated flavor profile. This is especially true for red wines since they are prized for their complex flavor profiles. By partially removing sugars from mature grape must, it is possible to produce wines with a mature, complex flavor profile, and fewer calories.

Low-sugar wines are produced by harvesting the grapes before they are fully mature. Immature grapes contain higher concentrations of starch, less sugars, and reduced beneficial compounds. Since the grapes are harvested before they mature, their flavors are not fully developed, complex, or sophisticated. Grower picks immature grapes to target a low sugar content to the detriment of an immature, simple, and unsophisticated flavor profile.

Orange juice is a popular breakfast drink and is recognized as a good source of essential minerals, vitamins, flavonoids, and other beneficial compounds. There is also agreement in the medical field that consumers should increase their consumption of orange juice and corresponding native natural beneficial compounds. However, consumers need to be aware of the high concentration of sugars in 100% orange juice.

An 8-ounce (240 ml) glass of orange juice contains 22 grams of sugar, which equate to about 110 calories. Orange juice has a standard of identity of 11.8° Brix. "Brix" is a refractive index scale for measuring the quantity of soluble solids (including fructose, glucose, sucrose, acids, and other soluble solids) in a solution at a given temperature. The "refracted Brix" is converted to "corrected Brix" by adjusting for the native acids (i.e., citric acid) in the orange juice. As a result, orange juice is commonly defined as Brix/acid or corrected Brix. The high sugar content and corresponding high calories are adversely affecting orange juice consumption.

Orange juice is produced by squeezing the liquid content from fresh oranges. The resulting juice product is passed through at least one screen, sieve, filter, or other processes to remove the peel, pith, large orange pieces, seeds, and excess pulp.

Orange juice is composed of water, sugar solids, and non-sugar-solids. The sugar solids are composed of simple sugars, including about 50% sucrose, 25% glucose, and 25% fructose. The non-sugar solids, including acids and beneficial compounds, constitute the remaining of the orange juice solids. The beneficial compounds include but are not limited to vitamins, minerals, flavonoids, antioxidants, pulp, acids, carotenoids (color), pectin, free amino acids, lipids, enzymes, and other non-volatile compounds.

Orange juice is available with different pulp concentrations (e.g., high pulp, medium pulp, low pulp, and clarified), pulp particle sizes, and pulp particle size distribution. The pulp may be homogenized or processed to reduce the particle size and produce a more uniform particle size distribution, which will keep it suspended in the finished juice. Orange juice and other pulp containing fruit juices from different vendors (domestic and international) have different pulp concentrations, particle size, and particle size distributions. Fruit juices with pulp are produced by adjusting the concentration of pulp in the finished beverage.

The composition of the non-sugar solids in orange, pineapple, and other fruit juices with pulp vary based on the juice producer and their proprietary manufacturing processes. The juices are standardized based on Brix and not the non-sugar solids. As a result, juice samples from different manufacturers (domestic and international) can have significantly different non-sugar solid concentrations, nutritional composition, and particle parameters (average particle size, particle size distribution, and particle percent (wt./wt.)). The technical and operational processing conditions are held as trade secrets by the juice manufacturer. The equipment used to produce fruit juice with pulp includes, but it is not limited to, passing the juice through multiple filters, screens, or other filtration processes. Due to the non-standardized, crude and varied processing conditions as it relates to the non-sugar solids, it is necessary to develop an innovative closed-loop process with well-defined parameters to control the fractionation; partial removal of the native sugars, and recombine of select fractions to produce reduced-sugar juice with pulp and reduced-sugar fruit must (with or without fruit skins). The non-solid sugars can interfere with the small particle filtration and/or chromatographic processes resulting in the loss of beneficial compounds during the separation processes.

Orange juice concentrate is produced by passing the juice through a heat exchanger to remove most (about 80% to about 90%) of the native water. The orange juice concentrate is stored frozen and shipped domestically and internationally to local and regional beverage plants. The manufacturing plants reconstitute (water is returned) the concentrate to produce "Orange Juice" (100% orange juice; based on the standard of identity) and "Orange Juice Beverages" (less than 100% orange juice; based on the standard of identity).

Below are the ingredient statement and nutritional information for 100%

Orange Juice—not from concentrate.
Ingredients: Orange Juice (not from concentrate)
Nutrition Facts—Service Size 8 oz (240 ml). 100% Juice.
Calories 110, Fat 0 g, Cholesterol 0 g, Sodium 0 mg, Total Carbohydrates 26 g 9%, Total Sugars 22 g, Protein 2 g. Amount per Serving % Daily Value—Potassium 450 mg, Vitamin C 90%, Folate 10%, Thiamin 8%, Magnesium 6%, Vitamin B6 4%, Niacin 2%, Calcium 2%. Not a significant source of Dietary Fiber, Vitamin A, or Iron.

Reduced-sugar orange juice beverages fill a marketing segment. Commercially available reduced-sugar orange juice beverages are produced by combining orange juice, water, high-intensity sweetener, acids, color (Beta Carotene), flavor, and other ingredients resulting in a beverage that has the sensory characteristics similar to 100% orange juice. They typically contain about 42% orange juice, including 10 grams of sugars (50 calories) and some native beneficial compounds per an 8 oz serving. However, since the beverage only contains 42% orange juice, it only contains 42% of the native vitamins, minerals, and other beneficial compounds of 100% orange juice. As a result, the reduced-sugar orange juice beverage may be supplemented with a few select "non-native" beneficial compounds. The resulting ingredient statement and nutritional panel are not as clean as one from 100% orange juice. Consumers are demanding products with clean labels. Below are the ingredient statements and nutritional fact panels for a reduced-calorie orange juice beverage.

Below are the ingredient statement and nutritional information for a reduced-sugar orange juice beverage.

Ingredients: Pure Filtered Water, Orange Juice, Less than 1% of: Vitamin C (Ascorbic Acid), Natural Flavors, Citric Acid, (Provides Tartness), Citric Pectin, Stevia Leaf Extract, Beta Carotene.

Nutrition Facts—Service Size 8 oz (240 ml). 42% Juice. Calories 50, Fat 0 g (0% DV), Sodium 10 mg (0% DV), Total Carbohydrates 12 g (4% DV), Total Sugars 11 g, Protein 1 g. Amount per Serving % Daily Value—Potassium 190 mg (4% DV), Vitamin A (25% DV), Vitamin C (100% DV), Thiamin (4% DV), Vitamin B6 (2% DV), Folate (4% DV), and Magnesium (2% DV). Not a significant source of Sat Fat, Fat, Trans Fat, Cholesterol, Fiber, Vitamin D, Calcium, and Iron.

Consumers have learned that current reduced-sugar orange juice beverages do not contain 100% juice, and as a result, they do not contain the nutritional content of 100% orange juice. They understand that if they want the nutritional benefits of a glass of 100% orange juice, they need to drink about 2.38 glasses of a reduced-sugar orange juice beverage. However, the consumption of 2.38 glasses of a reduced-sugar orange juice beverage would also contain about the same calories of a glass of 100% orange juice.

There is a market need for a reduced-sugar fruit juice beverage, with or without pulp, which has a similar (native) nutritional composition of 100% fruit juice, but with reduced sugars. The reduced-sugar fruit juice beverages include but not limited to orange, tangerine, pineapple, grape, apple, peach, prune, mango, and cherry.

A process of producing a reduced-sugar fruit juice and reduced-sugar fruit must may include passing an initial juice or an initial must of a fruit through at least one large particle separator to obtain a large particle cake/retentate and a large particle filtrate. The large particle cake/retentate has large particles with a first average size and including at least one of peel, pith, pulp, skins, seeds, stems, leaves, and fruit pieces.

The process may additionally include passing the large particle filtrate through at least one medium particle separator to obtain a medium particle cake/retentate and a medium particle filtrate. The medium particle cake/retentate has medium particles with a second average size that is smaller than the first average size of the large particles.

The process may also include passing the medium particle filtrate through at least one small particle separator to obtain a small particle retentate and a small particle filtrate. The small particle retentate has small particles with a third average size that is smaller than the second average size of the medium particles.

The process may also include passing the small particle filtrate through a chromatography column to obtain a sugar stream and a reduced-sugar filtrate via ligand chromatography or size exclusion chromatography.

The process may also include producing a reduced-sugar fruit juice with pulp by combining at least a portion of the medium particle cake/retentate and the reduced-sugar filtrate.

The process may also include producing a reduced-sugar fruit juice without pulp by combining at least a portion of the small particle retentate and the reduced-sugar filtrate.

The process may also include producing a reduced-sugar fruit must with fruit skins by combining at least a portion of the large particle cake/retentate and the reduced-sugar filtrate.

The process may also include producing a reduced-sugar fruit must without fruit skins by combining at least a portion of the small particle retentate and the reduced-sugar filtrate.

The process may further include producing a reduced-sugar fruit product by including at least a portion of the reduced-sugar filtrate and a diluent.

BRIEF DESCRIPTION OF THE FIGURES

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
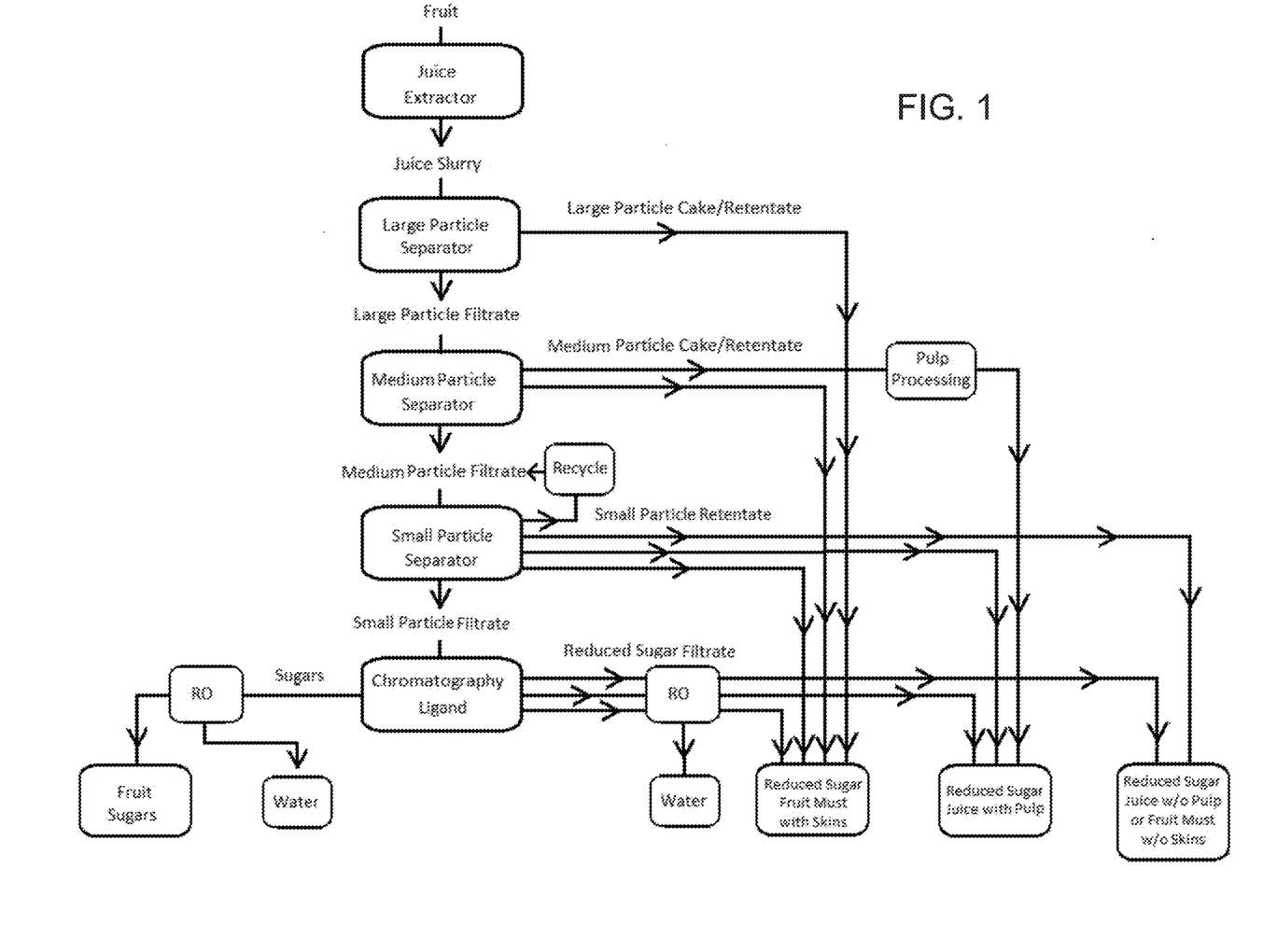
FIG. 1 is a process flow diagram of a sugar reduction process, including a ligand chromatographic process, according to an example embodiment.
Figure 2:
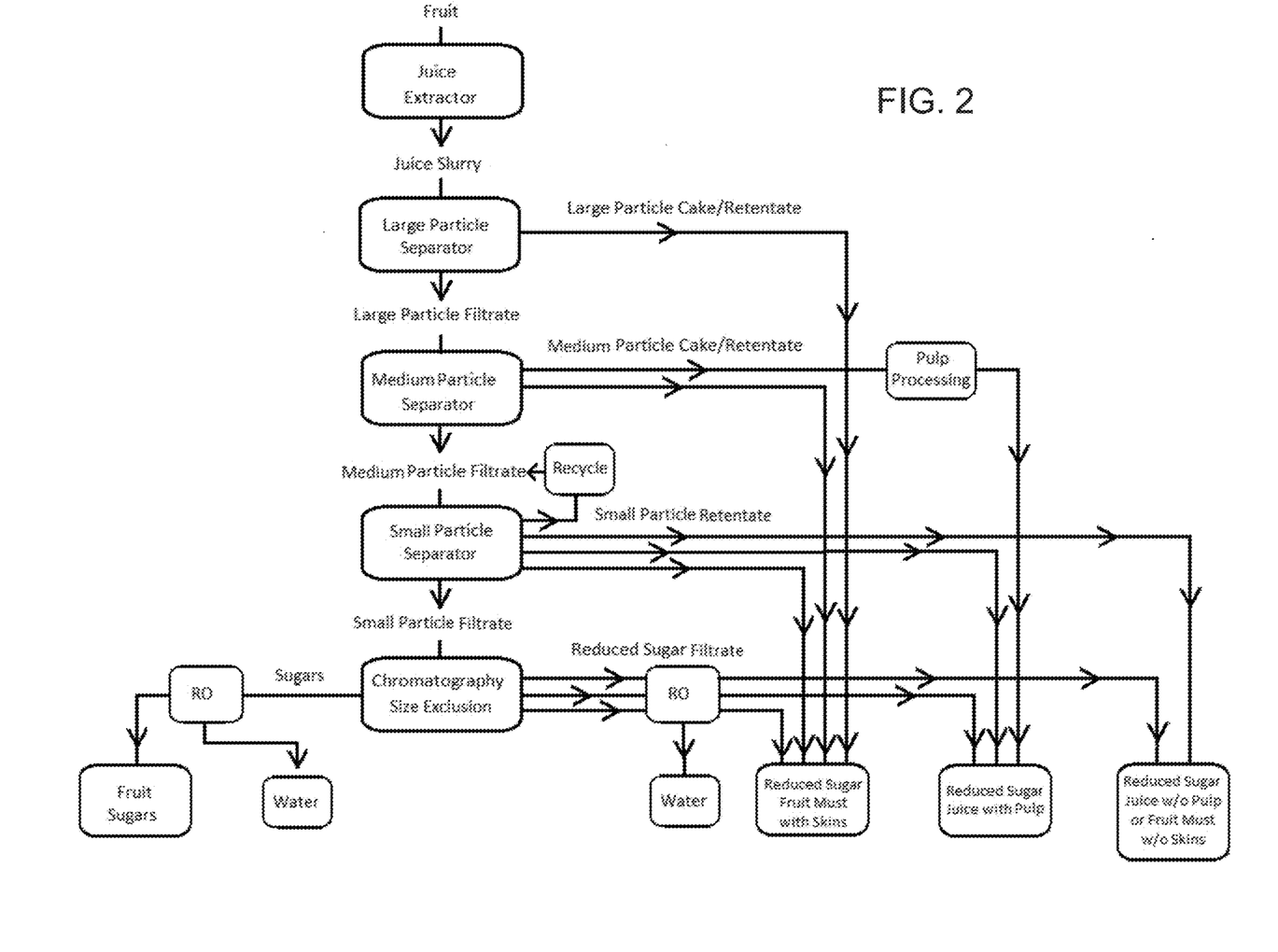
FIG. 2 is a process flow diagram of a sugar reduction process, including a size exclusion chromatographic process, according to an example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives thereof. Like numbers refer to like elements throughout the description of the figures.

It should be understood that when an element or layer is referred to as being "on," "connected to," "coupled to," "attached to," "adjacent to," "covering," etc. another element or layer, it may be directly on, connected to, coupled to, attached to, adjacent to, covering, etc. the other element or layer or intervening elements or layers may be present. In contrast, when an element is referred to as being "directly on," "directly connected to," "directly coupled to," etc. another element or layer, there are no intervening elements or layers present. Like numbers refer to like elements throughout the specification. As used herein, the term "and/or" includes any and all combinations or sub-combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements, and/or groups thereof.

When the terms "about" or "substantially" are used in this specification in connection with a numerical value, it is intended that the associated numerical value includes a manufacturing or operational tolerance (e.g., ±10%) around the stated numerical value. Moreover, when the terms "generally" or "substantially" are used in connection with geometric shapes, it is intended that precision of the geometric shape is not required but that latitude for the shape is within the scope of the disclosure. Furthermore, regardless of whether numerical values or shapes are modified as "about," "generally," or "substantially," it will be understood that these values and shapes should be construed as including a manufacturing or operational tolerance (e.g., ±10%) around the stated numerical values or shapes.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

The innovative process described below includes a closed-loop operation that manages the fractionation, reduction of native sugars, and recombination of native fruit fractions in the production of a reduced-sugar fruit juice or reduced-sugar fruit must. The unique process is advantageous to other processes that dilute the juice with water, uses non-native ingredients or ingredients from unknown sources to produce a reduced-sugar fruit juice. The closed-loop process allows for the recombination of reduced-sugar fruit juice fractions from the same fruit (native) to produce a reduced-sugar fruit juice or reduced-sugar fruit must.

A closed-loop process in combination with the recombination of native reduced-sugar fruit juice fractions would facilitate a petition with the USDA to label the reduced-sugar fruit juice beverage as 100% juice.

Since the standard identity for fruit juice is based on Brix and the innovative process partially removes some of the native sugars, it is necessary to use an internal non-sugar compound or external compound to standardize the non-sugar solids. The internal standard includes but not limited to native minerals (e.g., potassium, magnesium, etc.), pigments (e.g., B-carotene, anthocyanin, etc.), or vitamins.

Fruits including but not limited to oranges, tangerines, grapefruit, grapes, apples, pineapple, prunes, peaches, cherry, etc. are squeezed, pressed, extracted, crushed, macerated, etc. to remove the juice from the whole fruit. The crushed fruits can be identified as fruit slurry, crushed fruit, fruit puree, fruit must, fruit juice, etc. and contains at least one of juice, peel, pith, skin, rind, fruit pieces, stems, leaves, and seeds. The fruit slurry is passed through a large particle separator to separate the large particle cake/retentate from the large particle filtrate. The large particle cake/retentate includes at least one of fruit peel, rind, skins, seeds, large fruit pieces, and seeds. The large particle filtrate includes at least one of fruit juice (water, sugars, minerals, vitamins, color, pulp, flavor, pectin, oils, beneficial compounds, etc.), pectin, and fruit pieces. The large particle separator employs a screen or similar mechanical device, including at least one of a screen, sieve, filter, plate and plate filter with filter pads, filter cartridge, screw/screen, filter press, filter bag, press/screen, filter cartridge, centrifuge or other filter processes. The selection of the particle separator is dependent on the type of juice and particulate size and concentration. The screen would have target openings of 10 um to 10 mm and a range of 0.0001 um to 20 mm. Clear fruit juices (fruit juice without pulp) would use a screen with smaller openings to remove most of the fruit particles. Fruit juices with pulp would use a screen with larger openings to remove the rind, skins, seeds, etc. but allows for the passing of some of the pulp.

Grape, apple, peach, and other clear fruit juices use a screen with an optimal opening of about 1 um to 5 mm and a range of 0.0001 um to 20 mm. Orange juice, other citrus juices, or pulp containing juices would use a first particle separator with a screen with an optimal opening of about 100 um to 7 mm and a range of 0.0001 to 20 mm. A scraper is used to improve the particle separation process. The screen is made of metal, polymer, or organic components.

The large particle filtrate is passed through a medium particle separator to separate the medium particle cake/retentate from the medium particle filtrate. Commercial fruit juice or fruit juice concentrate without large particles could also be used. The medium particle cake/retentate includes at least one of pulp, small fruit pieces, peel, skin, etc. The medium particle filtrate includes at least one of fruit juice (water, sugars, color, pulp, flavor, pectin, ions, vitamins, flavor oils, beneficial compounds, etc.) and fruit pieces. The medium particle separator is similar to the large particle separator, but it is designed to remove the smaller suspended particles. It would employ a screen or similar mechanical device, including at least one of a screen, sieve, filter, plate and plate filter with filter pads, filter cartridge, screw/screen, filter press, press/screen, filter bag, filter cartridge, centrifuge, membrane or other filter processes. A variety of filtration processes can be used to remove the medium suspended particles with similar results. The second particle separator is dependent on the type of juice and particulate size and concentration. The screen would have target openings of 1 um to 3 mm and a range of 0.0001 um to 20 mm. Grape, apple, and other clear juices use a screen with an optimal opening of about 1 um to 1 mm and a range of 0.0001 um to 20 mm. Orange juice and other fruit juices containing juices use a screen with an optimal opening of about 10 um to 1 mm and a range of 0.0001 um to 20 mm. A scraper is used to improve the particle separation process. The screen is made of metal, polymer, or organic components.

Orange juice with pulp (without large particles) can also be used as an initial juice. A single combined separator (combines large and medium separators) can used since the large particles were already removed from the orange juice or orange juice concentrate.

The pulp should remain in their native form. Once the pulp and fruit pieces are mechanically or enzymatically processed, thereby reducing their size, the efficiency of the separation process may be reduced. Smaller partials may clog the opening in the particle separators.

Some fruit slurries (e.g., grape, apple, cranberry, grape must, etc.) can use a single particle separator to remove the large and medium particles in a single (medium particle filtration) processor medium and small particles in a single (small particle filtration) process.

The medium particle filtrate is passed through a small particle separator (e.g., nanofiltration, ultrafiltration, or other filtration processes) to separate the small particle retentate from the small particle filtrate. A commercial clear fruit juice or fruit juice concentrate, without large and medium particles, could also be used. The small particle retentate contains small particles including but not limited to small fruit pieces, pulp, pith, colors, skin, pectin, flavor oils, beneficial compounds, etc. The small particle filtrate includes but not limited to sugars (e.g., glucose, fructose, and sucrose), minerals (ions), vitamins, and other small molecular weight compounds. The small particle separator has optimal openings of 0.010 um to 1 mm and a range of 0.0001 urn to 20 mm. The small particle separator should be selected so that most of the sugars pass through the small particle separator while partially retaining the non-sugar solids. The small particle separator cutoff should be close to the molecular weight of the largest target components while still having a good separation of the other components and flow rate. If the flow rate is too slow, it would negatively impact the financial viability of the innovative process. Orange juice contains sucrose, fructose, and glucose. Grape juice contains fructose and glucose. The small particle separation process is more efficient when the citrus pulp and fruit pieces are in their native form and before they are mechanically (e.g., homogenized) or enzymatically treated since the smaller citrus pulp and pieces may clog the small particle separator and reduce the small particle separation efficiency. As a result, orange juice containing processed pulp may require a small particle separator with larger openings.

The small particle filtrate is passed through either a ligand chromatography or size exclusion chromatography to partially separate the native sugars from the non-sugar low molecular weight compounds.

The removal of the small MW particles (small particle retentate) and suspended compounds during the small particle separation process is needed to reduce the removal of beneficial compounds electrostatic attraction (absorption) of the native beneficial compounds (e.g., anthocyanins, resveratrol, antioxidants), and other beneficial compounds) by the resin beads and reduce the loss of benefited compounds being entrapped by pores in the resin beads. The removal of the small molecular weight compounds from the small particle filtrate results in the concentration of the sugar solids, tighter MW range in the small MW filtrate, and reduce the viscosity. The removal of the small molecular weight compounds also allows the column to operate at a lower temperature, lower head pressure, extended regeneration period, improved operational efficiency, a more compact column length, and improved sugar separation process efficiency. The column would also have less fouling, resulting in a small particle separator selection closer to the largest MW target while still having good throughput.

The small particle filtrate containing at least one sugar (e.g., fructose, glucose, or sucrose), (ions) minerals, vitamins, and small molecular compounds are passed through the ligand chromatography column to partially separate the small molecular weight compounds from the sugars. The column contains a cation exchange resin in the calcium form, which is capable of partially separating the ion and small molecular weight compounds from the sugars. As the juice passes through the column, calcium ions, having a very weak attraction for the sugars, slow their flow, and separate the sugar molecules and non-sugar solids. The sugars are not bound, absorbed, or adsorbed to the calcium ions. By adjusting the cutoff point, it is possible to produce a reduced-sugar filtrate with different sugar (Brix) content. The sugar stream can be concentrated (e.g., RO, heat, or vacuum) or added to other products to increase the natural sugar (Brix) content of the beverage.

Cations (e.g., calcium, potassium, magnesium, manganese, etc.), chelator (e.g., ethylenediaminetetraacetic acid (EDTA), ascorbic acid, etc.) and/or other compounds can be added to one of the fruit juice stream (e.g., small particle filtrate, etc.) to improve the chromatographic or filtration separation process. Cations inhibit the calcium disassociation from the resin beads, and chelators bind to the free ions, reducing their concentration and/or making them less reactive. By chelating the free ions, they are no longer able to dissociate the calcium from the resin-calcium complex, thus protecting the calcium-resin complex.

By coupling a single or multiple ligand chromatographic columns with a simulated moving bed process, it is possible to design and implement a very efficient inline and automated process. From a manufacturer's perspective, the process is very efficient with minimal operational or financial impacts. Water is removed from the reduced-sugar filtrate or sugar stream by RO, heat, or vacuum.

The small particle filtrate containing at least one sugar (e.g., fructose, glucose, or sucrose), ions, and small molecular compounds is passed through a size exclusion column to separate the ion from the sugars and small molecular compounds. Size exclusion chromatography separates compounds based on the size as they travel through a column of spherical porous resin beads. As the juice passes through the column, small components (e.g., ions potassium—39 Daltons and magnesium—24 Daltons) and small components enter the pores in the resins, while the sugars (sucrose—342 Daltons, fructose—180 Daltons, and glucose—180 Daltons) and the large molecular weights compounds are unable to enter the resin beads; as a result, they are excluded from the resin beads and stay within the mobile phase. Since the ions take longer to travel through the column, the ions are separated from the larger molecular weight compound (e.g., sugars). By adjusting the fraction cut point, it is possible to produced reduced-sugar filtrate with different Brix. The sugar stream can be added to other products to increase the natural sugar (Brix) content of the beverage.

Resin beads are selected for their bead sizes, porosity, pore size, column head pressure, column height, composition, etc. to efficiently fractionate the sugars and other small molecular weight components from the ions.

Reverse osmosis, heat, vacuum, or some other process may be used to remove water from at least one of the juice streams. The juice stream includes but it is not limited to the small particle retentate, reduced-sugar filtrate, sugar, or finished reduced sugar fruit must, reduced reduced-sugar fruit juice fraction or reduced-sugar fruit juice beverage (with or without pulp) or reduced-sugar fruit must (with or without fruit skins).

By coupling a single or multiple ion exclusion chromatographic columns with a simulated moving bed process, it is possible to design and implement a very efficient inline and automated process. From a manufacturer's perspective, the process is very efficient with minimal operational or financial impacts.

There is a consumer market for reduced-sugar fruit juice beverages with similar nutritional benefits and sensory properties of 100% fruit juice, but with reduced-sugars. It would include but not limited to orange juice, Concord grape juice, white grape juice, apple juice, pineapple juice, etc. There is also a growing market for reduced calorie red, rose, white wines, and wine containing beverages. By combining different fractions from the innovative process, it is possible to produce several different products, including reduced-sugar fruit juice without pulp, (e.g., grape juice, apple juice), reduced-sugar fruit juice must with fruit skins, (e.g., red or rose grape must), reduced-sugar fruit juice must without fruit skins, (e.g., white grape must), reduced-sugar fruit juice with pulp, (e.g., orange juice), and other reduced-sugar fruit juice products.

Reduced-sugar grape, apple, pear, pineapple, and other non-pulp containing fruit juice beverages are produced by combining at least a portion of the small particle retentate and the reduced-sugar filtrate (produced by ligand and/or size exclusion chromatography) or by combining at least a portion of the reduced-sugar filtrate and a diluent (e.g., water, fruit or vegetable juice). An internal standard (e.g., potassium, anthocyanin, etc.) or external (added) standard is used to adjust the non-sugar juice solids. With a partial removal of the sugars from the juice stream, a diluent adjustment (addition or removal) may be needed to maintain the concentrations of the non-sugar solids vs. 100% grape juice. The diluent would primarily be water, but other low-calorie liquid could be used. For example, diluents would include water, fruit or vegetable juice, low-calorie fruit or vegetable juices, coconut water, etc. Water could be removed from the fruit juice fractions or reduced-sugar fruit juice beverage by RO or heating. A high-intensity sweetener could be added to the beverage to add sweetness without adding calories. The juice could be supplemented with flavors, minerals, vitamins, probiotics, hydrocolloid (add mouthfeel), beneficial compounds, or other compounds.

Reduced-sugar grape must with skins is produced by combining at least a portion of the large particle cake/retentate, medium particle cake retentate, small particle retentate, and the reduced-sugar filtrate (produced by ligand and/or size exclusion chromatography or by combining at least a portion of the large particle cake/retentate and reduced-sugar filtrate.

Reduced-sugar grape must without skins is produced by combining at least a portion of the small particle retentate and the reduced-sugar filtrate (produced by ligand and/or size exclusion chromatography) or by combining at least a portion of the reduced-sugar filtrate and a diluent. An internal standard, including pigments (e.g., anthocyanin, B-Carotene, etc.), minerals (e.g., potassium, magnesium, etc.), some other internal compound, or an external (added) standard, is used to adjust the concentration of the non-sugar juice solids. With a partial removal of the sugars from the juice stream, a diluent adjustment (addition or removal) may be needed to maintain the concentrations of the non-sugar solids vs. 100% grape must. The diluent would primarily be water, but fruit or vegetable juices or low-sugar liquids could be used. RO could be used to remove water from the grape must fraction or reduced-sugar grape must. A high-intensity sweetener could be added to the wine beverage to add sweetness without adding calories. The grape must can contain a flavor, hydrocolloid, or other ingredients to add mouthfeel or improve other sensory characteristics.

Reduced-sugar orange juice or other pulp/particle-containing beverages/ingredients are produced by combining at least a portion of the medium particle cake/retentate, small particle retentate, and the reduced-sugar filtrate (produced by ligand and/or size exclusion chromatography) or by combining at least a portion of the medium particle cake/retentate and the reduced-sugar filtrate. The reduced sugar juices (with or without pulp) could also contain a diluent. By adjusting the amount of the medium particle cake/retentate in the reduced sugar juice beverage, it is possible to produce reduced-sugar orange juice beverages with different pulp concentrations from pulp-free to high-pulp. The pulp can also be ground into smaller pieces to increase the suspension properties of the pulp in the reduced-sugar orange juice beverage. An internal standard, including pigments (e.g., B-Carotene, anthocyanin, etc.), minerals (e.g., potassium, magnesium, etc.), some other internal compound, or an external (added) standard, is used to adjust the concentration of the non-sugar juice solids. With a partial removal of the sugars from the juice stream, a diluent adjustment (addition or removal) may be needed to maintain the concentrations of the non-sugar solids vs. 100% orange juice. The diluent would primarily be water, but other low-calorie liquid could be used. For example, diluents would include water, low-calorie fruit or vegetable juices, coconut water, etc. Water could be removed from the fruit juice fractions or reduced-sugar fruit juice beverage by RO or heating. A high-intensity sweetener could be added to the beverage to add sweetness without adding calories. The juice could be supplemented with flavors, minerals, vitamins, probiotics, hydrocolloids (add mouthfeel), beneficial compounds, or other compounds to improve the beverage.

EXAMPLES

Objective

The following examples show how the present process is practiced, but they should not be construed as limiting. In this application, all units are in the metric system, and all amounts and percentages are by weight, unless otherwise expressly indicated.

The present invention describes a closed-loop process for the production of a reduced-sugar fruit juice and reduced-sugar fruit must that has a similar non-caloric nutritional composition but with reduced-sugars as compared with 100% fruit juice or fruit must. The invention shows a closed-loop process that fractionates fruit slurry, partially removes the native sugars, and then recombines some or all of the fractions to produce a reduced-sugar fruit juice containing pulp, reduced-sugar fruit juice without pulp, reduced-sugar fruit must with skins, reduced-sugar fruit must without skins, and other reduced-sugar fruit juice products. The closed-loop process allows for the mass balance of native juice fractions in the production of reduced-sugar fruit juice products. All of the juice fractions originate from the incoming juice, and the primary ingredients (i.e., pulp) do not come from an external source. A reduced-sugar fruit juice beverage or fruit must may also contain at least one high-intensity sweetener, natural and/or artificial flavor, hydrocolloid, and water (increased or reduced as needed). Additional non-native ingredients (e.g., vitamins, minerals, probiotics, etc.) may be added to supplement the beverage. Sugars are reduced by 1-99% (wt./wt.), but with optimum sugar reductions in the range of 30-80% (wt./wt.).

Experimental Procedure

Reduced-Sugar Grape Juice Beverage

The purple grape juice (100%) control sample is prepared by squeezing fresh purple grapes and separating the large and medium particles (large and medium particle cake/retentate) from the grape juice slurry. The juice slurry is filtered through filter paper. The filtrate is used as the control sample. The 100% grape juice control sample has a Brix of about 16.2° at about 45° F.

Fresh purple grapes are manually crushed to release the fruit juice from the whole fruit. The crushed grapes are identified as grape juice slurry, crushed grapes, grape must, etc. The grape slurry is placed on a large particle separator (sieve) to separate the large particles (large particle cake/retentate) from grape juice (large particle filtrate). The sieve (#200) has 75 um openings (range of 1 um to 5 mm openings). A large flat disk is placed on top of the grape juice slurry and pressure is applied to removes as much juice as possible. A paddle scrapper is employed to improve the filtration process. The large particle cake/retentate contains grape skins, seeds, and large fruit pieces. The large particle filtrate contains grape juice (water, sugars (fructose, glucose, and a trace amount of sucrose), minerals (ions), vitamins, pigments (e.g., anthocyanins), beneficial compounds, grape particles, pectin, fiber, and other compounds. The large particle filtrate has a Brix of 16.2° at 45 F.

The purple grape large particle filtrate is passed through a medium particle separator (sieve) to separate the medium particles (medium particle cake/retentate) from the grape juice without medium particles (medium particle filtrate). The sieve (#270) has 53 um openings (range of 1 um to 1 mm openings). A large flat disk is placed on top of the grape large particle cake/retentate and pressure is applied to removes as much juice as possible. A paddle scrapper is employed to improve the filtration process. The medium particle cake/retentate contains medium suspended particles, including grape skins, fiber, and small fruit pieces. The medium particle filtrate contains grape juice (water, sugars (fructose, glucose, and a trace amount of sucrose), minerals (ions), vitamins, pigments (anthocyanins), beneficial compounds, small grape particles, pectin, fiber, and other compounds. The more suspended particles removed from the large particle filtrate will result in a more efficient small particle separation process.

The purple grape medium particle filtrate is passed through a small particle separator (nanofiltration membrane) to separate the small particle retentate from the small particle filtrate. The nanofiltration membrane process used a Millipore Pro-Lab membrane filtration system with a membrane cartridge having a molecular weight cutoff of about 500. A membrane with a range of 50 to 50,000 MW can be used to separate the small particle filtrate. Depending on a number of product and process variables, the small particle separator could use different filtration equipment and pore sizes. The small particle retentate contains small molecular weight compounds, including fruit pieces, fiber, pectin, pigments (anthocyanins), beneficial compounds, and other small particles. The small particle filtrate contains sugars (fructose and glucose), minerals (ions), vitamins, and other small molecular weight compounds.

The objective of the small particle separation process is to pass most of the sugars through the small particle separator while retaining some of the small particles (pulp, pectin, fiber, etc.), pigments (anthocyanins), beneficial compounds, and other suspended compounds in the small particle retentate. The small particle retentate can be combined with the medium particle filtrate or other juice streams (recycled) to remove additional sugars.

The purple grape small particle filtrate is passed through either a ligand-calcium chromatography column or size exclusion chromatography column to partially separate the sugars from the other compounds.

The removal of the small particles, including the beneficial compounds, from the medium particle filtrate, is designed to reduce the compounds being absorbed (electrostatic), adsorbed, entrapped or entangled within the resin and removed from the juice stream.

The purple grape small particle filtrate is passed through a ligand-calcium chromatography column to partially separate the sugars from the reduced sugar small particle filtrate. A 2.5 cm×5 cm column containing Dowex® Monosphere® 99CA/320 Separation Resin (cation exchange resin) with a flow rate of 10 mls per minute is used to partially separate the sugars from the reduced sugar filtrate. The cation exchange resin is in the calcium-resin form. The sugar stream contains water, fructose, glucose, and other small molecular weight compounds. The reduced-sugar filtrate contains water, fructose, glucose, minerals (ions), vitamins, pectin, pigments (anthocyanins), acids, flavor compounds, aroma compounds, beneficial compounds, and other small molecular weight compounds.

By adjusting the cutoff during the chromatographic process (ligand), it is possible to produce reduced-sugar filtrate with different sugar reductions (Brix).

Water is removed from the reduced-sugar filtrate and sugar stream by RO. Anthocyanin concentration is used as an internal standard to adjust the non-sugar grape juice solids.

Anthocyanins were found to electrostatically attract (Van Der Wall force) to the resin beads and were removed from the small particle filtrate. It is beneficial to retain some of the anthocyanins and other beneficial compounds in the small particle retentate. As the anthocyanins were absorbed by the resin, the efficiency of the separation process was reduced.

By coupling the ligand (calcium) exchange chromatography with a simulated moving bed, it is possible to set up as an inline and automated process. From a manufacturer's perspective, the process is very efficient with minimal operational or financial impacts.

The purple grape small particle filtrate is passed through a size exclusion chromatography column to separate the ions and smaller compounds (reduced-sugar filtrate) from the sugars and other small molecular weight compounds (sugars). A 3 cm×5 cm size exclusion column containing Sephadex G-10 resin with a molecular mass separation of 0-700 MW (range 0 to 50,000 MW) and a flow rate of 13 mls per minute is used to separate the small particle filtrate. The reduced-sugar filtrate primarily contains water minerals (ions), vitamins, smaller MW compounds, etc. The sugars stream contains water, sugars (glucose, fructose), and other small molecular weight components.

By adjusting the cutoff during the chromatographic process (size exclusion), it is possible to produce reduced-sugar grape juice or grape must with different sugar reductions (Brix).

Water is removed from the reduced-sugar filtrate and sugar streams by RO but could also be removed from other fruit juice streams or the finished fruit juice product. The anthocyanin concentration is used as an internal standard to adjust the non-sugar grape juice solids.

By coupling the chromatographic process (size exclusion) with a simulated moving bed, it is possible to design an inline and automated process that may not require a RO process. In addition, the process would be very efficient, flexible, and cost-effective.

The reduced-sugar (grape) juice beverage without pulp (e.g., grape, apple, pear, clarified orange, etc.) is produced by combining at least a portion of the small particle retentate, reduced-sugar filtrate (produced by ligand and/or size exclusion chromatography), sucralose-high-intensity sweetener (optional), and water adjusted to bring to 100% (adjusted as needed). Anthocyanin concentration is used as an internal standard to adjust the non-sugar compounds. The reduced-sugar filtrate is subjected to RO to remove water; however, if a simulated bed, with a single or multiple columns, were employed, a RO step may not be needed. If juice concentrate is used, the addition of water may be needed.

The reduced-sugar grape juice beverage with 30% (wt./wt.) reduction (Brix of about 11.4° and 0.1190 Kg solids/liter) to 80% (wt./wt.) reduction (Brix of about 3.3° and 0.0340 Kg solids/liter) also contains significant amounts of beneficial compounds per 8 ounces serving. Below are the ingredient statement and information for reduced-sugar grape juice beverage.

Ingredients: Grape juice, water, sucralose or Grape juice from concentrate (filtered water, grape juice concentrate), sucralose
  Nutrition Facts—Service Size 8 oz (240 ml)
  Calories 28-98, Fat 0 g, Cholesterol 0 g, Sodium 0 mg, Total Sugars 7-24.5 g, Protein <1 g. Calcium 2%, Potassium 98 mg, Not a significant source of Dietary Fiber, Vitamin A, or Iron.

The 50% reduced-sugar grape juice beverage had a Brix of about 8.3°, similar flavor, aroma, taste, color, sweetness intensity, and appearance to 100% grape Juice. The beverage has a thinner mouthfeel vs. control and slightly different sweetness profile. The thinner mouthfeel is due to the removal of 50% of the sugars. The different sweetness profile is due to the removal of 50% of sugars and the addition of sucralose.

Reduced-Sugar Red Grape Must

The reduced-sugar grape must with skins (e.g., red or blush grape must) is produced by combining at least a portion of the small particle retentate and the reduced-sugar filtrate (produced by ligand and/or size exclusion chromatography. The grape must also contain a portion of the large particle cake/retentate and/or medium particle cake retentate, a high-intensity sweetener (optional), and water adjustment to bring to 100% (optional). It is not necessary to add all of the large particle cake/retentate and/or medium particle cake retentate to the grape must. A single particle separator can be used to remove the large particle cake/retentate and medium particle cake/retentate in a single operational step.

Reduced-Sugar White Grape Must

The reduced-sugar (white) grape must, without skins (e.g., white grape must) is produced by combining at least a portion of the small particle retentate, reduced-sugar filtrate (ligand exchange or size exclusion), a high-intensity sweetener (optional), and water adjusted to bring to 100% (optional). Since the large particle cakes/retentate and medium particle cakes/retentate are not returned to the white grape must, a single particle separation process can be used to remove the large and medium particles or medium and small particles.

Reduced-Sugar Orange Juice Beverage

The orange juice (100%) control sample is prepared by squeezing fresh oranges and passing the juice through a sieve with 2 mm openings to remove the rind, peel, seeds, fruit pieces, and pith. The 100% orange juice with pulp control sample has a corrected Brix of about 11.9° at about 45° F.

Orange juice is produced by squeezing juice from fresh oranges. The orange juice slurry is passed through the large particle separator (sieve) to remove the large particles (large particle cake/retentate) from the juice (large particle filtrate). The sieve (#10) has 2 mm openings (range of 100 um to 7 mm openings). A large flat disk is placed on top of the orange juice slurry and pressure is evenly applied. The pressure is maintained to removes as much juice as possible. A paddle scrapper is employed to improve the filtration process. The large particle cake/retentate contains orange peel, fruit pith, seeds, and large orange particles. The large particle filtrate contains orange juice (water, sugars (sucrose, glucose, and fructose), minerals (ions), vitamins, colors, acids, fiber, flavors, pectin, pulp, and small orange particles. The large particle filtrate has a corrected Brix of 11.9° at 45 F.

The orange juice large particle filtrate is passed through a medium particle separator (sieve) to separate the medium particles (medium particle cake/retentate) from the juice without medium particles (medium particle filtrate). A sieve (#270) with 53 um openings (range of 1 um to 1 mm openings) is used to remove the medium particles. The large particle filtrate is pressed with a large flat disk to removes as much juice as possible. A paddle scrapper is used to improve the filtration process. The medium particle cake/retentate contains pulp, medium fruit pieces, fiber, and other medium particles. The medium particle filtrate contains orange juice (water, sugars (sucrose, glucose, and fructose), minerals (ions), vitamins, colors, acids, beneficial compounds, flavors, pectin, pulp), and small orange particles. The more suspended particles removed from the large particle filtrate will result in a more efficient small particle separation process.

The orange juice medium particle filtrate is passed through a small particle separator (nanofiltration membrane) to separate small particle retentate from the small particle filtrate. The small particle separation process used a Millipore Pro-Lab membrane filtration system with a membrane cartridge having a molecular weight cutoff of about 750. A membrane with a range of 50 to 50,000 MW can be used to separate the small particles. The small particle retentate contains the small molecular weight compounds, including pulp, pectin, flavor, color, beneficial compounds, sugars (sucrose, glucose, and fructose), etc. The small particle filtrate contains sugars (sucrose, fructose, and glucose), minerals (ions), vitamins, and other smaller molecular weight compounds. The more complete the removal of the small particles from the medium particle filtrate stream will facilitate a more efficient chromatographic process. The small particle retentate can be combined with the medium particle filtrate or other juice streams (recycled) to remove additional sugars.

The orange juice small particle filtrate is passed through either a ligand-calcium chromatography column or size exclusion column to partially separate the sugars from the other compounds.

The removal of the small particles, including some of the beneficial compounds, from the medium particle filtrate, is designed to reduce the compounds being absorbed (electrostatic), adsorbed, entrapped or entangled within the resin and removed from the juice stream.

The orange juice small particle filtrate is passed through a cation (ligand) exchange chromatography column to partially separate the sugars from the reduced-sugar filtrate. A 2.5 cm×10.0 cm column of Dowex® Monosphere® 99CA/320 separation resin with a flow rate of 10 mls per minute as used to separate the small particle filtrate. The cation exchange resin is in the calcium-resin form. The sugar stream contained water, sucrose, fructose, glucose, and other small molecular weight compounds. The reduced-sugar filtrate contains water, minerals (ions), colors (B-carotene), vitamins, acids, flavor compounds, aroma compounds, beneficial compounds, sugars (sucrose, fructose, and glucose), and other small MW compounds.

By adjusting the cutoff during the chromatographic process, it is possible to produced reduced-sugar orange juice with different sugar concentrations (Brix).

Water is removed from the reduced-sugar filtrate and sugar stream by RO. B-Carotene concentration is used as an internal standard to adjust the non-sugar orange juice solids.

By coupling the ligand (calcium) exchange chromatography with a simulated moving bed, it is possible to set up as an inline and automated process. From a manufacturer's perspective, the process is very efficient with minimal operational or financial impacts.

The orange juice small particle filtrate is passed through a size exclusion chromatography column to separate the ions and smaller compounds (reduced-sugar filtrate) from the sugars and other small molecular weight compounds (sugars). A 3 cm×5 cm size exclusion column containing Sephadex G-15 resin with a molecular mass separation of 0-1500 MW (range 0 to 50,000 MW) and a flow rate of 13 mls per minute is used to separate the ions and smaller compounds from the sugars and small molecular weight compounds. The reduced-sugar filtrate primarily contained minerals (ions) and smaller MW compounds. The sugars stream contains sugars (glucose, fructose) and other small molecular weight components.

By adjusting the cutoff during the chromatographic process, it is possible to produced reduced-sugar orange juice with different sugar concentrations (Brix). Water is removed from the reduced-sugar filtrate or other fruit juice streams by RO.

By coupling the size-exclusion chromatography with a simulated moving bed, it is possible to set up as an inline and automated process that may not require an RO process.

The reduced-sugar (orange) juice beverage with pulp (e.g., orange, pineapple, tangerine, grapefruit, etc.) is produced by combining at least a portion of the small particle retentate and the reduced-sugar filtrate (produced by ligand and/or size exclusion chromatography and at least a portion of the medium particle cake/retentate and/or small particle cake retentate, sucralose-high-intensity sweetener (optional), and water adjustment to bring to 100% (optional). It is not necessary to add all of the medium particle cake/retentate to the beverage. The reduced-sugar orange juice beverage is standardized by using a color (e.g., Beta Carotene) as the internal standard, but other internal or external compounds could be used to standardize the beverage. If juice concentrate is used, the addition of water may be needed.

The reduced-sugar orange juice beverage with a 30% reduction (adjusted Brix of about 8.37° and 0.08631 Kg sugar solids/liter) to 80% reduction (adjusted Brix of about 2.4° and 0.02466 Kg sugar solids/liter) and contains significant amounts of beneficial compounds per 8 ounces serving. Below are the ingredient statement and nutritional information for reduced-sugar orange juice beverage.

Ingredients: Orange juice, water, sucralose or orange juice from concentrate (filtered water, orange juice concentrate), sucralose Nutrition Facts—Service Size 8 oz (240 ml)

Calories 22-77, Fat 0 g, Cholesterol 0 g, Sodium 0 mg, Total Sugars 4.4 to 16.1 g, Protein 2 g. Calcium 2%, Potassium 315 mg, Magnesium 17 mg. Vitamin C 80%. Not a significant source of Dietary Fiber, Vitamin A, Niacin, or Iron.

The reduced-sugar orange juice beverage with about 50% less sugar has a Brix of about 6.0°, similar flavor, aroma, taste, color, sweetness intensity, and appearance to 100% grape Juice. The beverage has a slightly thinner mouthfeel vs. control and different sweetness profile. The different sweetness profile is due to the partial removal of sugars and the addition of sucralose.

The formulations (reduced-sugar fruit juice with or without pulp, reduced-sugar fruit must with or without skins, and reduced sugar juice products) in the disclosures can vary to a certain extent depending on factors including the level of sugar reduction, market segmentation, desired sensory and nutritional attributes. Supplements and beverage modifiers include but not limited to juice concentration, vitamins, minerals, pulp, flavor, taste modifiers, hydrocolloid, process improvers, and other ingredients that can be added to the beverage. The beverage or one or more fractions could be passed through a resin column to remove acids. A person skilled in the art knows the ingredients, concentrations, or process needed to achieve the desired results.

CONCLUSION

The results illustrate the production of a reduced-sugar fruit juice with pulp, reduced-sugar fruit juice without pulp, reduced-sugar fruit must with fruit skins, reduced-sugar fruit must without fruit skins, fruit sugar, and reduced-sugar fruit products that meet the objectives of the present invention.

While the processes and products herein have been described with reference to various embodiments, those ordinarily skilled in the art will understand that various changes may be made, and equivalents may be substituted for elements thereof without departing from the true spirit of the scope and essence of the disclosure including combinations of features that are individually disclosed or claimed herein. In addition, many modifications may be made to adapt a particular situation or material to the teachings of the disclosure without departing from the scope thereof. Therefore, it is intended that the disclosure not be limited to the particular embodiments disclosed, but that the disclosure will include all embodiments falling within the scope of the appended claims. All citations referred herein are expressly incorporated herein by reference.

The invention claimed is:

1. A process of producing a reduced-sugar fruit juice and reduced-sugar fruit must, comprising:
   providing an initial juice consisting essentially of an extract from an orange or a grape, wherein the initial juice includes: sugars extracted from the orange or the grape; vitamins extracted from the orange or the grape; mineral ionic compounds, including potassium and magnesium, extracted from the orange or the grape; acid extracted from the orange or the grape, and a must from the orange or the grape including at least one of: peel, pith, pulp, skins, seeds, stems, leaves, orange pieces, or grape pieces;

passing the initial juice through at least one large particle separator to obtain a large particle cake/retentate and a large particle filtrate, wherein the large particle cake/retentate includes large particles with a first average size, including at least one of: peel, pith, pulp, skins, seeds, stems, leaves, or pieces from the must of the orange or the grape; wherein the large particle separator has openings in a range of 10 um to 20 mm or uses at least one of a screen, sieve, strainer, plate and plate filter, filter cartridge, screw, press, pulper, finisher, or centrifuge; wherein the large particle filtrate includes: the sugars extracted from the orange or the grape; the vitamins extracted from the orange or the grape; the mineral ionic compounds extracted from the orange or the grape; the acid extracted from the orange or the grape; and at least one of the pieces of the orange or the grape or pulp from the orange or the grape;

passing the large particle filtrate through at least one medium particle separator to obtain a medium particle cake/retentate and a medium particle filtrate; wherein the medium particle cake/retentate includes medium particles with a second average size that is smaller than the first average size of the large particles, and at least one of: the pieces of the orange or the grape or pulp from the orange or the grape; wherein the medium particle filtrate includes: the sugars extracted from the orange or the grape; the vitamins extracted from the orange or the grape; the mineral ionic compounds extracted from the orange or the grape; and the acid extracted from the orange or the grape;

passing the medium particle filtrate through at least one small particle separator to obtain a small particle retentate and a small particle filtrate; wherein the small particle separator is configured to separate or remove at least one of: the pieces, pulp, pith, colors, or skin from the orange or the grape, while allowing the sugars extracted from the orange or the grape to pass through the small particle separator; wherein the small particle retentate includes small particles with a third average size that is smaller than the second average size of the medium particles; wherein the small particle filtrate includes: the sugars extracted from the orange or the grape; the vitamins extracted from the orange or the grape; and the mineral ionic compounds extracted from the orange or the grape;

passing the small particle filtrate through a chromatography column configured to produce two major streams including a mixed sugar stream, including at least the sugars, and a reduced-sugar filtrate, including: the vitamins extracted from the orange or the grape; and the mineral ionic compounds including the potassium and the magnesium extracted from the orange or the grape; via ligand chromatography, the ligand chromatography utilizing cationic exchange resin beads in calcium form which have calcium ions with a weak attraction for sugars, in the small particle filtrate so as to slow a flow of the sugars extracted from the orange or the grape relative to non-sugars extracted from the orange or the grape in the small particle filtrate to obtain the mixed sugar stream and the reduced-sugar filtrate;

producing a reduced-sugar orange beverage with pulp or a reduced-sugar grape beverage with pulp by combining at least a portion of the medium particle cake/retentate and the reduced-sugar filtrate;

producing a reduced-sugar orange beverage without pulp or a reduced-sugar grape beverage without pulp by combining at least a portion of the small particle retentate and the reduced-sugar filtrate; and producing a reduced-sugar orange product or a reduced-sugar grape product by including at least a portion of the reduced-sugar filtrate and a diluent;

wherein the reduced-sugar orange beverage has at least one of a (native potassium mg per 8 oz):(Brix) ratio greater than 37.62 or a (native potassium mg per 8 oz):(kg sugar solids/liter) ratio greater than 2.106;

wherein the reduced-sugar grape beverage has at least one of a (native potassium mg per 8 oz):(Brix) ratio greater than 8.60 or a (native potassium mg per 8 oz):(kg sugar solids/liter) ratio greater than 823.

2. The process of claim 1, wherein the producing of the reduced-sugar orange beverage with pulp or the reduced-sugar grape beverage with pulp includes further combining at least a portion of the small particle retentate.

3. The process of claim 1, wherein a sugar content of the initial juice is reduced by 10 to 99% (wt./wt.).

4. The process of claim 1, wherein the medium particle cake/retentate includes native pulp, and the producing the reduced-sugar orange beverage with pulp or the reduced-sugar grape beverage with pulp includes processing the medium particle cake/retentate to reduce a particle size of the native pulp to obtain native processed pulp for the reduced-sugar orange beverage with pulp or the reduced-sugar grape beverage with pulp.

5. The process of claim 1, wherein the medium particle cake/retentate includes pulp from the orange or the grape, wherein the reduced-sugar orange beverage with pulp has pulp from the orange or the reduced-sugar grape beverage with pulp has pulp from the grape.

6. The process of claim 1, wherein an internal non-sugar compound or an external compound is used to standardize non-sugar solids in at least one of: the reduced-sugar filtrate; the reduced-sugar orange beverage or the reduced-sugar grape beverage; or the reduced-sugar orange product or the reduced-sugar grape product.

7. The process of claim 1, wherein the diluent includes at least one of water, a separately-produced fruit juice, a vegetable juice, or a low-calorie liquid.

8. The process of claim 1, wherein the medium particle separator uses at least one of a screen, sieve, strainer, filter, plate and plate filter, filter cartridge, screw, press, pulper, finisher, or centrifuge.

9. The process of claim 1, wherein the medium particle separator has openings in a range of 0.0001 um to 20 mm.

10. The process of claim 1, wherein the small particle separator includes a nanofiltration, ultrafiltration, or a sock filter.

11. The process of claim 1, wherein the large particle separator and the medium particle separator are combined as a single initial separator, or the medium particle separator and the small particle separator are combined as a single subsequent separator.

12. The process of claim 1, further comprising: recycling the small particle retentate such that the small particle retentate is combined with the medium particle filtrate.

13. The process of claim 1, further comprising: adding a processing aid to the large particle filtrate, the medium particle filtrate, or the small particle filtrate prior to the chromatography column, the processing aid including one or more of chelators, minerals, compounds, or ions selected to improve a chromatographic separation within the chromatography column.

14. The process of claim 1, wherein the chromatography column is coupled with a simulated moving bed.

15. The process of claim 1, wherein the chromatography column is in a form of a single column or a plurality of columns.

16. The process of claim 1, further comprising: treating at least one of: the reduced-sugar filtrate; the reduced-sugar orange beverage or the reduced-sugar grape beverage; or the reduced-sugar orange product or the reduced-sugar grape product; via one or more of a reduction or supplementation of a level of a component therein, via dilution, or via concentration.

17. The process of claim 1, further comprising: adding calcium, potassium, magnesium, or manganese to the small particle filtrate prior to passing the small particle filtrate through the chromatography column.

18. The process of claim 1, wherein the reduced-sugar orange beverage or the reduced-sugar grape beverage has a native nutritional composition similar to that of the initial juice and a sugar content that is reduced by 10 to 99% (wt./wt.) relative to the initial juice.

19. The process of claim 1, wherein the medium particle separator has openings in a range of 1 um to 3 mm.

20. The process of claim 1, wherein a sugar content of the initial juice is reduced by 30 to 80% (wt./wt.).

21. The process of claim 1, wherein the reduced-sugar orange beverage is a reduced-sugar orange beverage having an adjusted Brix of between about 2.4° and 8.37°.

22. The process of claim 1, wherein the small particle separator has pore opening from about 0.001 to 0.60 um.

* * * * *